United States Patent [19]
Magnes

[11] Patent Number: 5,908,175
[45] Date of Patent: Jun. 1, 1999

[54] ONE-PIECE AIRPLANE TAIL-CONE WITH INSPECTION DOOR(S)

[76] Inventor: Gene Magnes, 902 Airport Loop, Twin Falls, Id. 83301

[21] Appl. No.: 08/974,521

[22] Filed: Nov. 19, 1997

[51] Int. Cl.⁶ .................................. B64C 1/00; B64C 1/26
[52] U.S. Cl. ......................... 244/119; 244/117 R; 244/87
[58] Field of Search ................................ 244/119, 129.5, 244/129.4, 133, 91, 87

[56] References Cited

U.S. PATENT DOCUMENTS

| | | | |
|---|---|---|---|
| 1,392,278 | 9/1921 | Kirkman et al. | 244/87 |
| 2,783,007 | 2/1957 | Nociti et al. | 244/129.4 |
| 3,571,977 | 3/1971 | Abeel | 244/129.5 |
| 4,448,372 | 5/1984 | Larson | 244/87 |
| 4,712,751 | 12/1987 | Hirschel | 244/119 |
| 5,692,704 | 12/1997 | Buttgereit et al. | 244/119 |

*Primary Examiner*—Charles T. Jordan
*Assistant Examiner*—Patricia L. Zuniga

*Attorney, Agent, or Firm*—Ken J. Pedersen; Barbara S. Pedersen

[57] ABSTRACT

One of the routines required for maintaining the air worthiness of an aircraft is the frequent inspection of rudder and elevator cables. Given traditional aircraft design, for example the Cessna "335" and "340" aircraft, access to these cables has been achievable only by removing the tail-cone from the body of the aircraft. Composed as they have been of aluminum or ABS plastic, these tail-cones have been prone to breakage. Their replacements, also of ABS plastic, have consisted of two large halves bolted together, one of which must still be removed from the aircraft to allow cable inspection and for which breakage is still a concern. The invented generally one-piece tail-cone molded of fiberglass constitutes a durable replacement for a broken cone. Equipping the new fiberglass cone with relatively small doors to be used for cable inspection allows the tail-cone to remain in place on the aircraft during its conceivable considerably lengthened life span. Coverings for these door holes are easy to remove and reinstall, aerodynamic, safe, and are economical to replace when necessary.

20 Claims, 7 Drawing Sheets

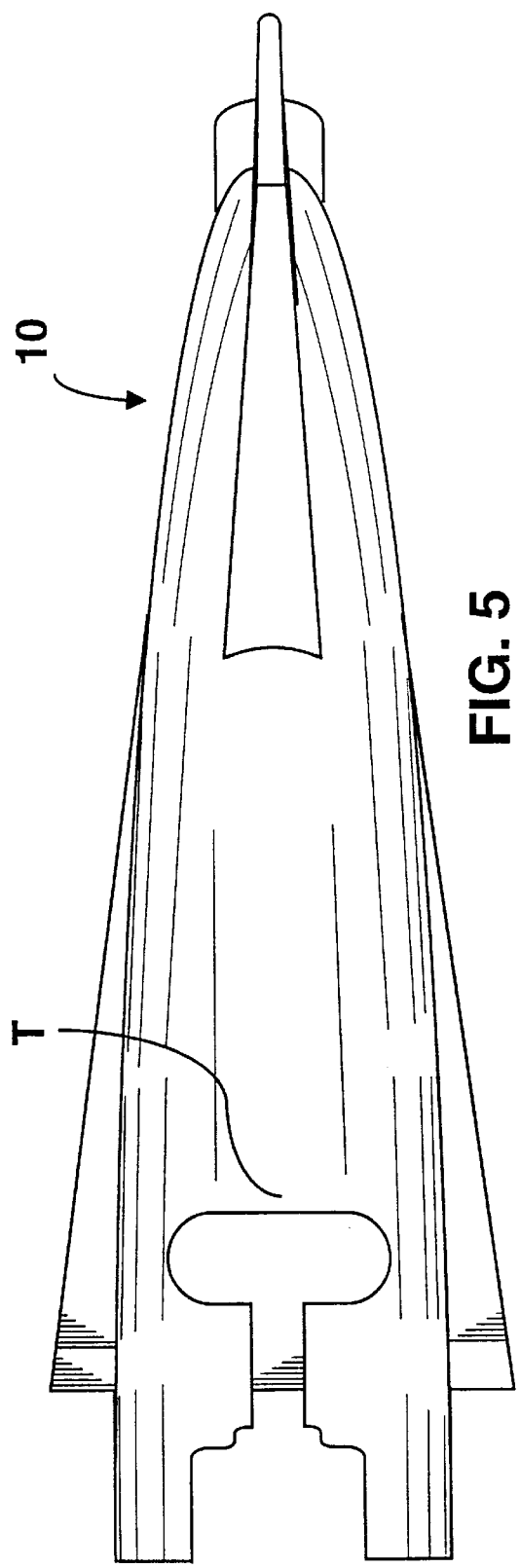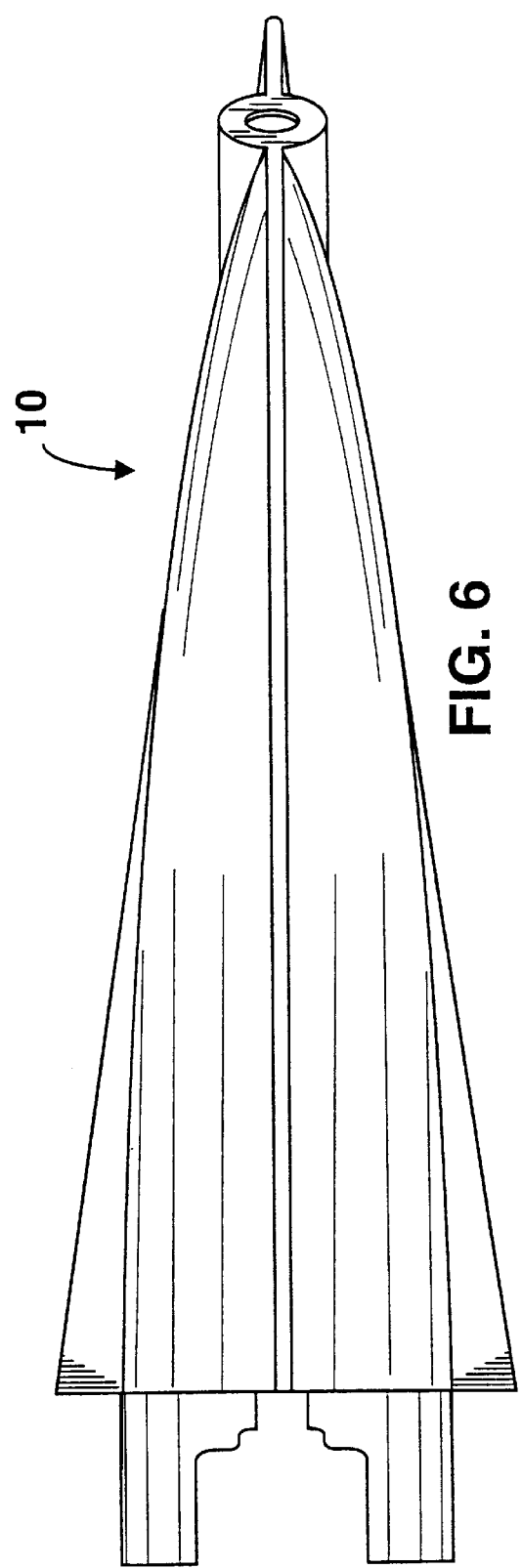

ONE-PIECE AIRPLANE TAIL-CONE WITH INSPECTION DOOR(S)

BACKGROUND OF THE INVENTION

1. Field of the Invention

The innovations here disclosed concern the tail-cones of aircraft, specifically, modifications to their traditional composition and design intended to improve their serviceability and longevity.

2. Related Art

Inside the tail-cone of an aircraft reside the cables connected to and controlling the rudder, and the push-rod which is connected to and controlling the elevators. Inspection of these cables and push-rod is required upon completion of each one hundred hours of flying time. Taking as examples the Cessna 335 and 340 aircraft, access to these cables requires the removal of the tail-cone from the body of the aircraft. Frequent removal and reinstallation of a tail-cone is time consuming and expensive and entails significant wear and tear to the cone itself. Generally composed of aluminum or ABS plastic, a tail-cone is fragile, even brittle, and breakage is common.

Again, using the Cessna 335 and 340 aircraft as examples, broken tail-cones are replaced by two-piece ABS replacement cones supplied by the manufacturer. Cable inspection is then accomplished by removal of one of the tail-cone's two pieces. Composed of ABS plastic, this piece is quite brittle and vulnerable to wear and tear. This two piece tail-cone consists of a top piece meeting a bottom piece at a generally horizontal seam, with the two pieces being bolted to the rear of the plane underneath the rudder and around the rear of the elevators. The manufacturer is reported to mold a one-piece tail-cone and then cut it from front to back along a generally horizontal line, starting at the center of the left and right elevator fairings (F) in FIG. 2 and extending back and down slightly to finish the cut below the tail light housing (L) at the far rear of the tail-cone. The manufacturer then expects the aircraft maintenance personnel to bolt the two pieces onto the plane. The position of the bottom piece, designated for removal during inspection, is beneath and in close proximity to the elevators or "tail flaps", making removal difficult. Therefore, breakage of this two-piece tail-cone is still common.

Because of the difficulty of certifying new small airplanes and modifications to old airplanes, there are still many of the older planes in use. The Cessna 340 tail-cone fragility and inspection problem has long been, and continues to be, a serious problem for smaller commercial and private aircraft owners and operators. Therefore, there has been a long-time need for improvement in the tail-cone design to allow less expensive and less damaging inspections.

SUMMARY OF THE INVENTION

The problems explained above can be mitigated by the present invention, which comprises a tail-cone molded of fiberglass. The inherent flexibility of fiberglass greatly diminishes the tendency toward cracking and breaking. The present invention preferably comprises a one-piece tail-cone, preferably designed to replace the conventional ABS Cessna tail-cones and the brittle Cessna two-piece, horizontal-seam replacement tail-cone.

A further innovation comprises the installation of one or more small doors or ports or windows in the cone large enough to allow inspection of the cables, but small in relation to the overall size of the cone. The covers of these doors or ports or windows are relatively easy to remove and reinstall and constitute minimal breaks in the integrity of a generally one piece tail-cone design.

The invented inspection-door tail-cone design utilizes doors that are surprisingly small, but that allow a good inspection of the cables on both sides of the airplane tail. A door preferably is located on each side of the tail-cone, very near the elevator and elevator fairing, and in about the front ¼ of the length of the tail-cone side and about the top ¼ of the side of the tail-cone that is below the elevator cutout 8 in FIG. 2. The small ports are positioned precisely and are small enough to maintain the structural integrity of the tail-cone, while allowing the insertion of a hand with a flash light and allowing the inspector to peer into the interior of the tail-cone at a wide range of angles. Thus, the invented tail-cone is effective and strong, and significantly decreases the cracking and loss of tail-cones and tail-cone pieces, and significantly increases the speed and economy of performing the inspection.

BRIEF DESCRIPTION OF THE DRAWINGS

FIG. 5 is a top view of the cone depicted in FIGS. 2–4.

FIG. 6 is a bottom view of the cone depicted in FIGS. 2–5.

DESCRIPTION OF THE PREFERRED EMBODIMENTS

Referring to the Figures, there is shown one, but not the only, embodiment of the invented inspection door tail-cone. The invented tail-cone may be substantially the same general shape as the original tail-cone for the aircraft 100 being fitted, in order to reduce or eliminate the need for re-certification of the invented tail-cone for a particular aircraft. For example, in the Cessna 340 or 335 aircrafts, the manufacture of the invented replacement aircraft tail-cone from fiberglass allows the original or earlier replacement tail-cone to serve as the model for the new cone; a mold may be made directly from the original or earlier replacement cone, with modifications made for the added port system and the internal bulk heads and stiffeners.

Fiberglass is lightweight, durable, workable, and flexible. These qualities make it a desirable medium in the manufacturing process and serve well in actual use when forming a constituent component of an aircraft.

Figure 1:
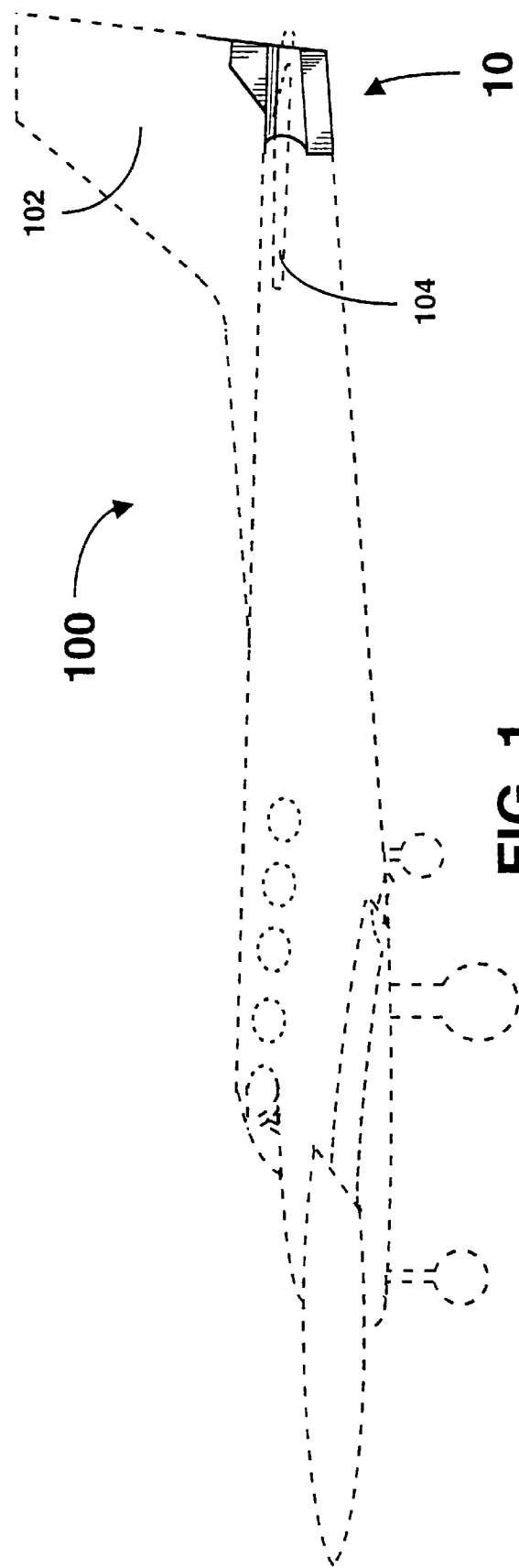
FIG. 1 is the outline of an aircraft with particular emphasis given to the tail-cone.
Figure 2:
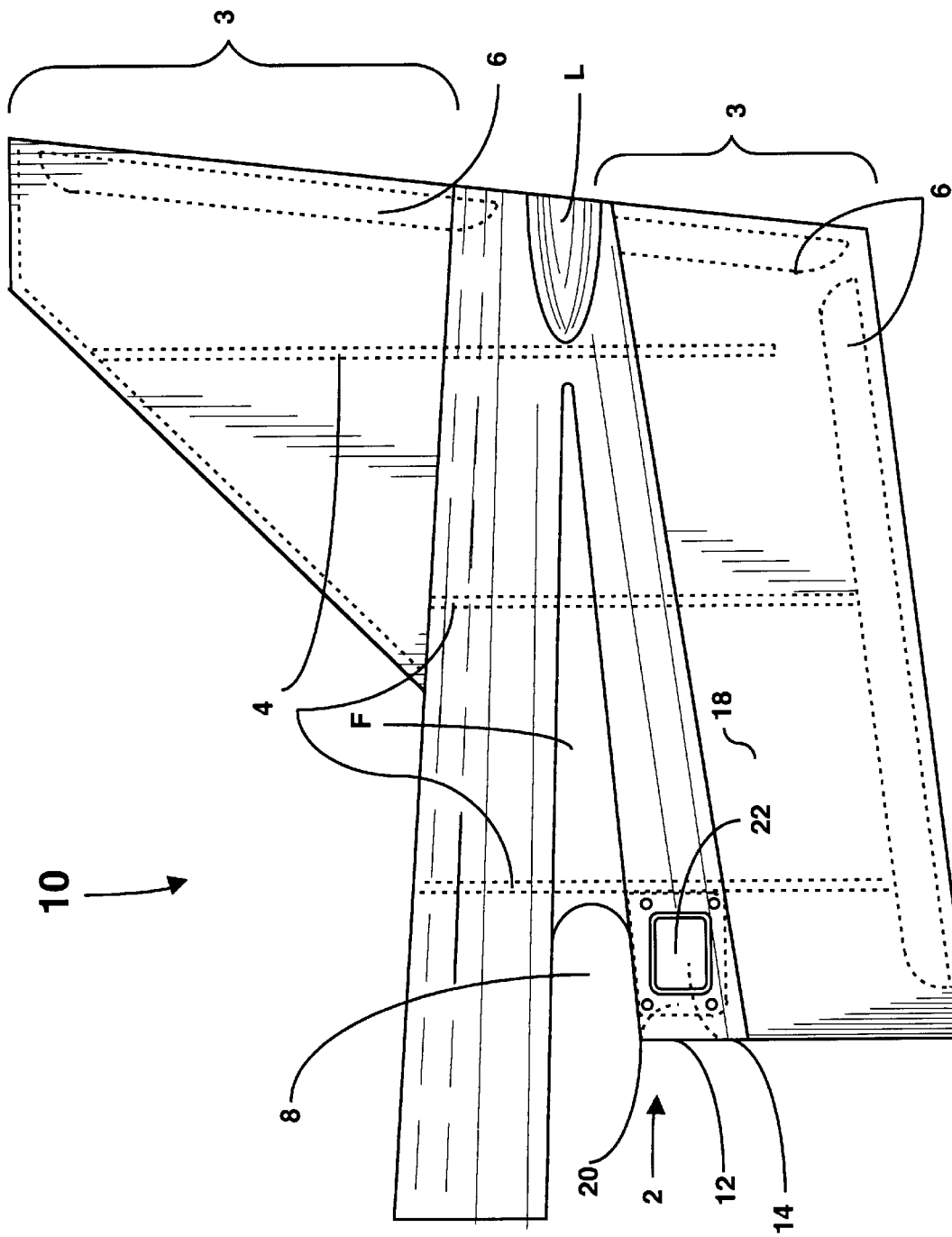
FIG. 2 is a side view of the tail-cone of one embodiment of the invention, including an inspection port or door, wherein the other side view is preferably a mirror-image of the this side view.
Figure 3:
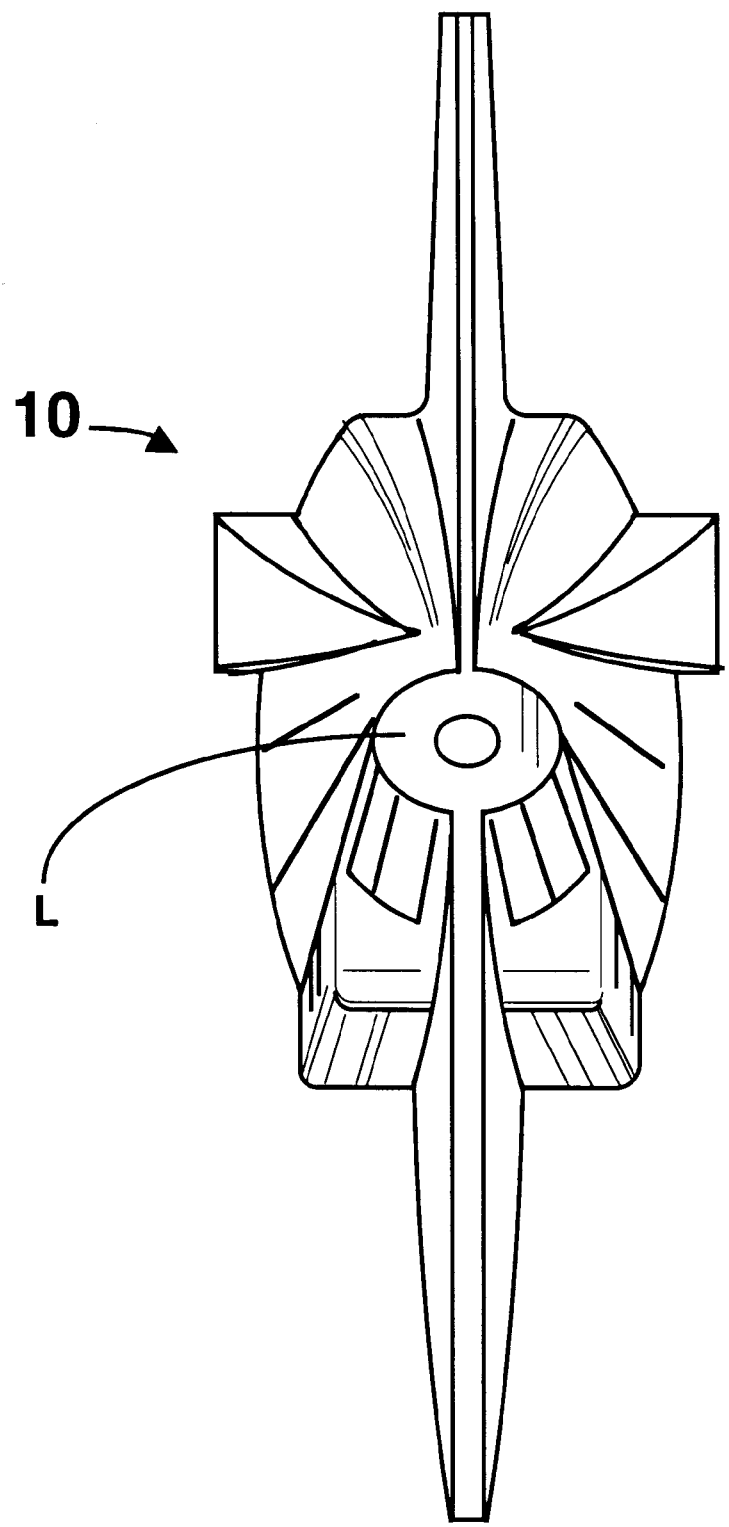
FIG. 3 is a rear view of the cone depicted in FIG. 2.
Figure 4:
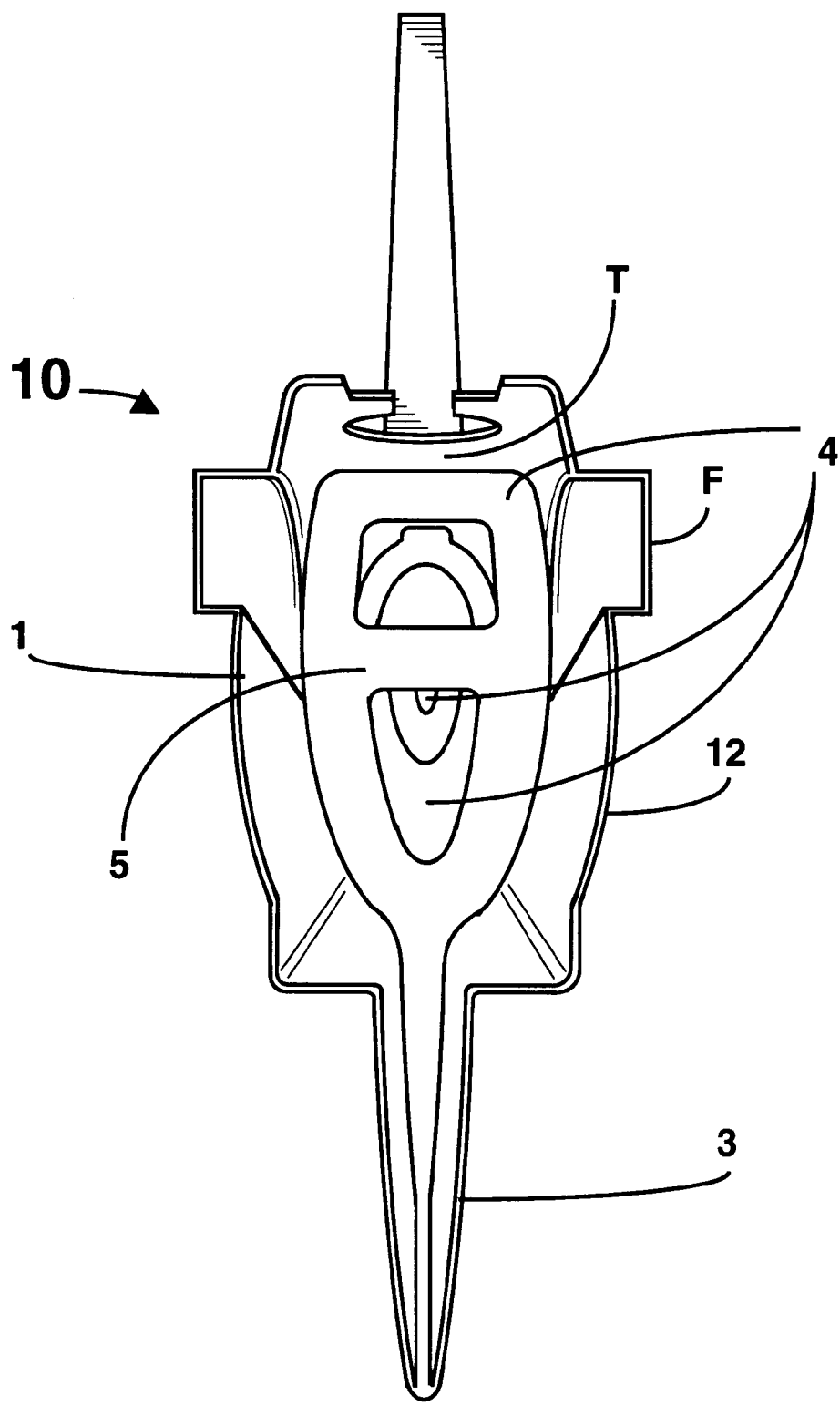
FIG. 4 is a front view of the cone depicted in FIGS. 2 and 3, showing the interior of the cone complete with bulkheads.

FIG. 1 shows the relative size and placement of a tail-cone on an aircraft 100, with the rudder 102 extending vertically up above the tail-cone and the elevators 104 extending horizontally outward. FIGS. 2–6 show one embodiment of the tail-cone 10 of the present invention before installation on an aircraft. In FIG. 2 are illustrated the reinforcement means 4, also called "bulkheads", in dashed lines. These bulkheads 4 are generally vertical. These bulkheads 4 are also shown in FIG. 4, which is as if the viewer is looking into the interior of the cone from the front. These bulkheads 4 circumscribe the interior surface 1 of the one-piece tail-cone 10. These bulkheads 4 preferably, but not necessarily, vertically extend to the acutely-angled top and bottom dorsal fin(s) 3 of the tail-cone 10, if such dorsal fin(s) 3 is present at the cross-section of the tail-cone 10 wherein a particular bulkhead is located. These bulkheads 4 also preferably, but not necessarily contain a rigid horizontal center span 5 which serves to strengthen the tail-cone 10. In FIG. 2, invented stiffeners 6 are also shown in dashed outline. These stiffeners 6 are of a generally V-shaped rigid fiberglass material, and are inserted into the acutely-angled rear and bottom "folds" or "dorsal fins" of the fiberglass body panels and fastened to the inside of the skin by means of a silicone dioxide powder, such as Cabosil™, added to fiberglass resin. These reinforcers (4) and the added stiffeners 6 act as the skeleton for the molded fiberglass tail-cone shell or skin. These reinforcers and stiffeners help maintain the structural integrity of the tail-cone 10, and, because the tail-cone 10 skin is a single, integral, unitary piece of fiberglass, plus one or more small covered doors, there need be no cutting through or discontinuities in the reinforcers or stiffeners or skin.

The invented door system 2 is shown in FIG. 2, and it preferably, but not necessarily, comprises of two mirror-image covered doors, one on each side of the tail-cone 10, just under the elevator cutout 8 and just rear of the front edge 12 of the tail-cone 10. Alternatively, the inventor envisions a single door at the top of the tail-cone, which would be close to and possibly an extension of the opening for the rudder. Thus, this single door may be in the area mark "T" in FIGS. 4 and 5.

The door system 2 comprises an opening 14 or aperture in the wall of the tail-cone, approximately 2 to 4 inches down from the elevator cutout 8 and 4 to 6 inches in back of the front edge 12. The size and placement of the opening 14 are such as to allow inspection inside the cone of the aircraft's rudder and tail flap cables, by shining a flashlight into the interior space and peering into the interior space at the wide and inclusive angles allowed by the location of the opening 14.

At all other times besides the inspection, the opening would be covered by a correctly sized cover 16 of fiberglass or compatible material which would be securely attached to the tail-cone wall 18. Attachment would be achieved using preferably AN/175 bolts and AN/MS nuts or other forms of attachment means allowing the removal and reattachment of each window or port hole cover as often as required but without disturbance to the basic structure of the tail-cone itself or to the cone's position on the body of the aircraft. Opening 14 is preferably about 3 inches high by about 4 inches wide, and for most small aircraft would be 3–5 inches high and 4–6 inches wide.

Figure 7A:
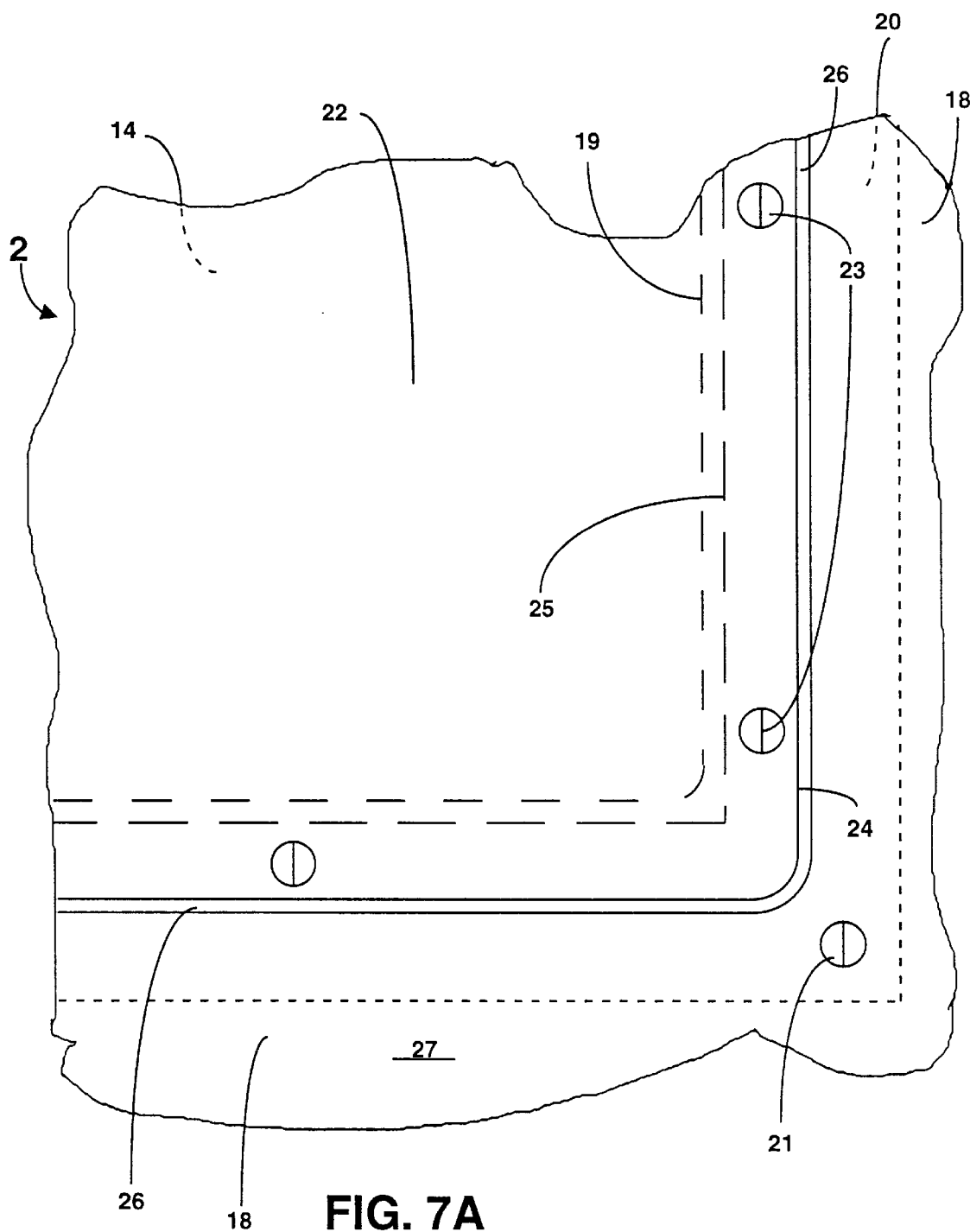
FIG. 7A is a partial plan detail view of the door system of the embodiment of FIGS. 2–6.
Figure 7B:
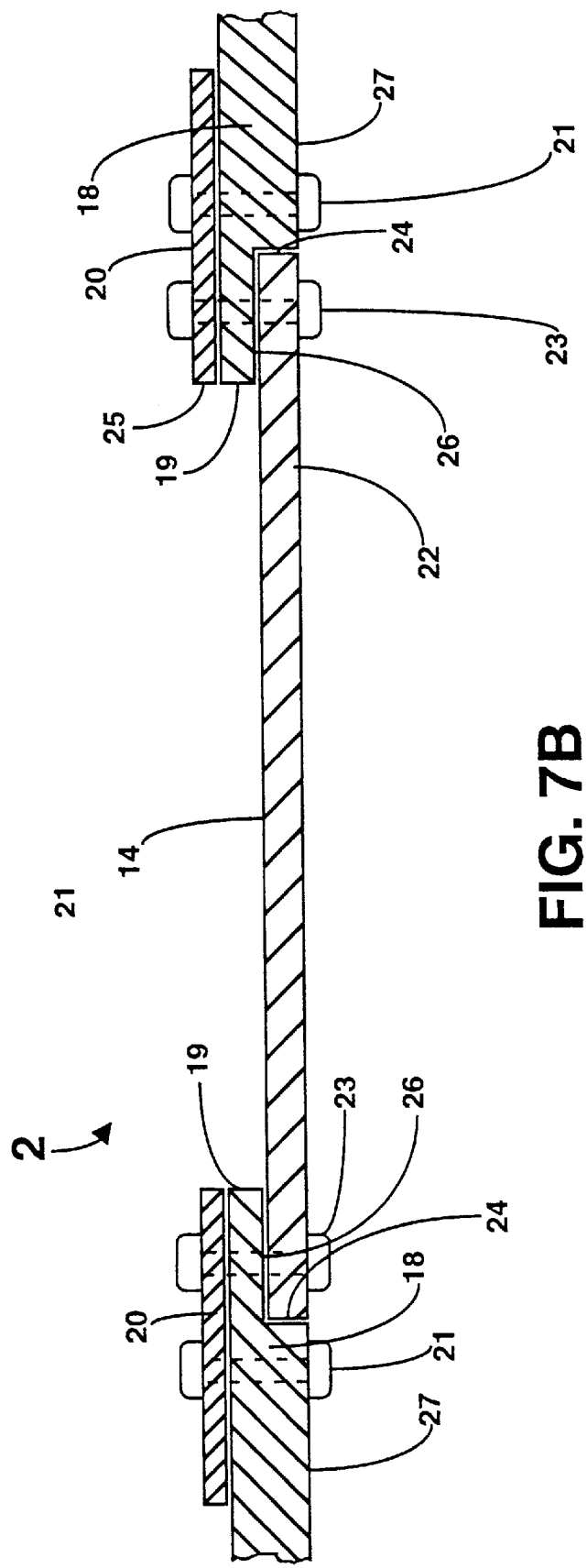
FIG. 7B is a schematic cross-sectional view of the door system of FIGS. 2–6.

Preferably, as shown in FIG. 7A and the thin cross-section of FIG. 7B, the door system 2 comprises an opening 14 in the tail-cone skin 18 with a perimeter 19 defining the opening 14, which is typically about 3 inches high and 4 inches wide for a Cessna 340. Generally, in back of the cone skin 18 around the opening 14 is a reinforcing frame 20, bolted to the inner surface of the skin 18 at its four corners with nuts and bolts 21 as described above. The frame 20 inner perimeter 25 is closely adjacent around its four sides to the opening perimeter 19. An outer door 22 of about 4–5 inches high by 5–6 inches wide lies on the outside of the skin 18, overlapping the skin 18 about ½–1 inch at its outer perimeter 24. The door 22 is bolted to the skin 18, with 6 bolts 23 passing through the door 22, the skin 18, and the frame 20. The door 22 sets in a recess 26 in the skin 18, so that the door 22 is generally flush with the skin surface around the door 22, that is, approximately co-planar with the surrounding skin outer surface 27. The recess 26 extends from the opening perimeter 19 outward 1–2 inches in a rectangular shape. Thus, the tail-cone may be said to have a recessed surface around the opening, so that the door outer surface is flush with the tail-cone outer surface beyond (or outward from) the door. This recessed feature improves aerodynamics and allows the invented tail-cone to fall within the original tail-cone certification. The door 22 and skin 18 with recess 26 are preferably fiberglass and the frame 20 is preferably fiberglass also.

Although this invention has been described above with reference to particular means, materials and embodiments, it is to be understood that the invention is not limited to these disclosed particulars, but extends instead to all equivalents within the scope of the following claims.

I claim:

1. An aircraft tail-cone system comprising:
    a one-piece tail-cone for substantially covering an aircraft's rear portion generally behind and below an aircraft's rudder and elevators, said rear portion containing rudder and elevator cables;
    said one-piece tail-cone being made substantially of fiberglass;
    said one-piece tail-cone having an interior surface which is generally vertically circumscribed by bulkheads;
    said one-piece tail-cone having an inspection opening for allowing inspection of said rudder and elevator cables inside the tail-cone;
    and a door system for covering said inspection opening.

2. An aircraft tail-cone system as in claim 1, wherein the one-piece tail-cone has a plurality of inspection openings, and the tail-cone system further comprises a door system for each inspection opening.

3. An aircraft tail-cone system as in claim 1, wherein the one-piece tail-cone has two inspection openings and right and left elevator cutouts for receiving right and left aircraft elevators, wherein one of said inspection openings is below each of said right and left elevator cutouts.

4. An aircraft tail-cone system as in claim 4, wherein the one-piece tail-cone has an outer surface and a recessed surface forming a recess around the opening, and the door system comprises a generally planar outer door extending across the opening and received in the recess, wherein the outer door is generally co-planar with the tail-cone outer surface.

5. An aircraft tail-cone system as in claim 4, wherein the tail-cone has an inner surface around the opening, and the door system further comprises a frame attached to the inner surface around the opening.

6. An aircraft tail-cone system as in claim 5, further comprising connectors extending between the door, through the tail-cone around the opening, and to the frame, for securing the door to the tail-cone and the frame.

7. An aircraft tail-cone system comprising:
    an aircraft having a rear portion comprising a rudder and right and left elevators;
    cables extending generally forward from the rudder and right and left elevators for controlling said rudder and elevators;
    a one-piece tail-cone for substantially covering the aircraft rear portion generally behind and below the aircraft's rudder and elevators, and having an interior space for receiving said cables;

wherein the one-piece tail-cone is made substantially of fiberglass;

said one-piece tail-cone having an interior surface which is generally vertically circumscribed by bulkheads;

wherein the tail-cone has an inspection opening for allowing inspection of said cables inside the tail-cone; and a door system for covering the opening.

8. An aircraft tail-cone system as in claim 7, wherein the one-piece tail-cone has a plurality of inspection openings, and the tail-cone system further comprises a door system for each inspection opening.

9. An aircraft tail-cone system as in claim 7, wherein the one-piece tail-cone has two inspection openings and right and left elevator cutouts for receiving the right and left aircraft elevators, wherein one of said inspection openings is below each of said right and left elevator cutouts.

10. An aircraft tail-cone system as in claim 7, wherein the one-piece tail-cone has an outer surface and a recessed surface forming a recess around the opening, and the door system comprises a generally planar outer door extending across the opening and received in the recess, wherein the outer door is generally co-planar with the tail-cone outer surface.

11. An aircraft tail-cone system as in claim 10, wherein the tail-cone has an inner surface around the opening, and the door system further comprises a frame attached to the inner surface around the opening.

12. An aircraft tail-cone system as in claim 11, further comprising connectors extending between the door, through the tail-cone around the opening, and to the frame, for securing the door to the tail-cone and the frame.

13. An aircraft tail-cone system as in claim 1, wherein said interior surface has acutely-angled rear and bottom dorsal fins.

14. An aircraft tail-cone system as in claim 13, wherein the convex point of generally V-shaped rigid fiberglass stiffeners are inserted into the concave portion of said acutely-angled rear and bottom dorsal fins, said stiffeners being fastened to said dorsal fins of the aircraft tail-cone by a material comprising silicon dioxide powder added to fiberglass resin.

15. An aircraft tail-cone system as in claim 7, wherein said interior surface has acutely-angled rear and bottom folds.

16. An aircraft tail-cone system as in claim 15, wherein the convex point of generally V-shaped rigid fiberglass stiffeners are inserted into the concave portion of said acutely-angled rear and bottom folds, said stiffeners being fastened to said folds of the aircraft tail-cone by a material comprising silicon dioxide powder added to fiberglass resin.

17. An aircraft tail-cone system as in claim 1, wherein said bulkheads have an outer portion fitting the interior dimension of the one-piece tail-cone.

18. An aircraft tail-cone system as in claim 17, wherein said bulkheads each have a horizontal center span.

19. An aircraft tail-cone system as in claim 7, wherein said bulkheads have an outer portion fitting the interior dimension of the one-piece tail-cone.

20. An aircraft tail-cone system as in claim 19, wherein said bulkheads each have a horizontal center span.

* * * * *